(12) United States Patent
Näslund et al.

(10) Patent No.: US 7,481,344 B2
(45) Date of Patent: Jan. 27, 2009

(54) LOAD CARRIER FOR TRANSPORTING A BICYCLE

(75) Inventors: Henrik Näslund, Jönköping (SE); Andreas Arvidsson, Värnamo (SE); Anders Nilsson, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 10/905,079

(22) Filed: Dec. 14, 2004

(65) Prior Publication Data

US 2005/0284905 A1 Dec. 29, 2005

Related U.S. Application Data

(63) Continuation of application No. PCT/SE03/00888, filed on May 30, 2003, now abandoned.

(30) Foreign Application Priority Data

Jun. 14, 2002 (SE) .................................. 0201832

(51) Int. Cl.
*B60R 9/00* (2006.01)
(52) U.S. Cl. .................. 224/319; 224/321; 224/324
(58) Field of Classification Search ............... 224/570, 224/319, 924, 321, 324, 440, 422, 419, 425, 224/443, 454, 458, 442
See application file for complete search history.

(56) References Cited

U.S. PATENT DOCUMENTS 2,125,214 A * 7/1938 Apfel et al. .................... 294/11
4,702,401 A * 10/1987 Graber et al. ................ 224/536
5,203,484 A * 4/1993 Englander ................... 224/324
5,377,886 A * 1/1995 Sickler ....................... 224/521

(Continued)

FOREIGN PATENT DOCUMENTS

SE 502961 C2 3/1996

(Continued)

*Primary Examiner*—Nathan J Newhouse
*Assistant Examiner*—Lester L Vanterpool
(74) *Attorney, Agent, or Firm*—Novak Druce + Quigg, LLP

(57) ABSTRACT

Load carrier (1) for transporting a bicycle (2) and which is designed for being mounted to a vehicle roof (4) by means of mounting devices (3). The load carrier includes a longitudinal rail section (5) provided with connecting devices (14,15) for connection to the mounting devices and securing devices (6) for securing the wheels (7,8) of the loaded bicycle, a retaining arm (16) pivotable arranged relative to the rail and provided with a claw grip (17) having a first and a second jaw (18 and 19 respectively) which jaws are lateral (T) to the longitudinal direction of the rail section (L) and arranged so as to form a gap (51) facing the side (S) of the longitudinal rail section from which side the bicycle is loaded. The retaining arm is arranged so that it can be turned to a position in which the claw grip can be connected to the frame (51) of the loaded bicycle when the bicycle is raised into the upright position, and in which position the claw grip can be tightened about the frame to hold the loaded bicycle in the upright position. The longitudinal direction (A-A) of the longitudinal rail section (5), in the area of one wheel (7 or 8) of a bicycle loaded thereon is arranged at an angle (α) relative to the longitudinal direction (B-B) of the rail section in the area of the second wheel of the bicycle which causes the bicycle to move along the rail section so that the frame (52) of the bicycle enters into active engagement with at least one of the jaws (18, 19) of the claw grip (17) and thereby ensures that the bicycle remains in the upright position even if the claw grip (17) is not tightened.

9 Claims, 7 Drawing Sheets

U.S. PATENT DOCUMENTS

| | | | | |
|---|---|---|---|---|
| 5,570,825 | A | * | 11/1996 | Cona .......................... 224/495 |
| 5,762,248 | A | * | 6/1998 | Englander et al. ........... 224/324 |
| 5,820,002 | A | * | 10/1998 | Allen ........................ 224/324 |
| 5,988,403 | A | * | 11/1999 | Robideau ..................... 211/20 |
| 6,296,162 | B1 | * | 10/2001 | Englander et al. ........... 224/324 |
| 6,892,913 | B1 | * | 5/2005 | Andersson .................. 224/319 |

FOREIGN PATENT DOCUMENTS

| | | |
|---|---|---|
| SE | 003086-6 A1 | 3/2002 |
| WO | WO 0138141 A1 | 5/2001 |
| WO | WO 0208019 A1 | 1/2002 |
| WO | WO 0218177 A1 | 3/2002 |

* cited by examiner

Vy C-C

Vy D-D

LOAD CARRIER FOR TRANSPORTING A BICYCLE

CROSS-REFRENCE TO RELATED APPLICATIONS

The present application is a continuation patent application of International Application No. PCT/SE03/00888 filed 30 May 2003 which was published in English pursuant to Article 21(2) of the Patent Cooperation Treaty, and which claims priority to Swedish Application No. 0201832-3 filed 14 Jun. 2002. Said applications are expressly incorporated herein by reference in their entireties.

TECHNICAL FIELD

The present invention relates to a load carrier for transporting a bicycle which is designed to be mounted on a vehicle roof by means of mounting devices. The load carrier includes a longitudinal rail section provided with connecting devices for connection to the mounting devices, and securing devices for securing the wheels of the bicycle loaded thereon. A retaining arm is pivotably arranged relative to the rail section and provided with a claw grip consisting of a first and a second jaw that are positioned laterally with respect to the longitudinal direction of the rail section. They are arranged so that they form a gap facing the side of the longitudinal rail section from which the bicycle is loaded. The retaining arm is arranged to pivot so that it can be turned to a position in which the claw grip can be attached to the frame of the loaded bicycle when the bicycle is in the upright position, and in which position the claw grip can be tightened around the frame to hold the bicycle in the upright position.

BACKGROUND ART

Load carriers of the type described above are common. These include those described in the applicant's application SE 9302881-9, as well as in U.S. Pat. No. 4,702,401 and WO 01/38141. The disadvantage of these earlier load carriers, however, is that they afford a loaded bicycle insufficient support to prevent it from falling before the claw grip is securely attached to the frame. This requires the person loading the bicycle to use one arm to ensure that the bicycle does not fall, with the result that only one arm is free to attach the claw grip to the frame, which can be very difficult, especially when the claw grip itself requires several actions to attach it securely. In WO 02/18177, this has been solved by providing the rail section in the area of the front wheel of the bicycle with a trough, in which the wheel is placed, providing the bicycle with sufficient stability to remain upright in the rail section without support other than that provided by the trough. The disadvantage of this solution, however, is that between different bicycles, their wheels often have varying wheel width; therefore, it may easily happen that a bicycle wheel does not fit in the trough because the wheel is too wide or that the bicycle is not afforded support because the wheel is too narrow.

A further disadvantage of earlier load carriers is that the bicycle wheels may easily be placed outside the rail section when loading the bicycle on the load carrier, since the rail section is narrow, and when the bicycle is difficult to lift onto the load carrier when the latter is mounted on a vehicle roof. This disadvantage is especially noticeable when the person lifting the bicycle is slight in either stature or strength, which is often the case when the person lifting the bicycle is a child or a woman.

Yet another disadvantage of earlier devices is that the claw grip is so arranged that it must be adjusted to the open position by the user before it can be attached to the bicycle frame, which may easily present the user with problems if he forgets to adjust the device to the open position before placing the bicycle on the load carrier. Thus, previously known load carriers suffer from a large number of disadvantages which make it difficult, and sometimes impossible, to load a bicycle onto them without damage to the vehicle on which the load carrier is mounted when the person loading the bicycle is not sufficiently tall relative to the vehicle or possesses insufficient bodily strength.

In view thereof, there exists a need for a load carrier of such design that it affords a solution which overcomes the disadvantages of previously known load carriers and on which it is easy to load a bicycle.

SUMMARY OF THE INVENTION

The present invention overcomes the disadvantages by means of a load carrier of the type described above, which is characterized in that the longitudinal direction of the rail section, in the area of one wheel of a bicycle loaded thereon is arranged at an angle relative to the longitudinal direction of the rail section in the area of the second wheel of the bicycle loaded on it. This causes the bicycle to move along the rail section resulting in the frame of the bicycle entering into active engagement with at least one of the jaws of the claw grip. In this manner it is ensured that the bicycle remains in the upright position even when the claw grip is not tightened.

The present invention is further characterized in that the angle in question is between 179 and 160 degrees. In a preferred embodiment, the invention is further characterized in that the angle in question is between 175 and 165 degrees. In an embodiment that is further yet preferred, the angle in question measures between 174 and 172 degrees.

As an alternative, the present invention affords a load carrier of the type described above, which is characterized in that the claw grip is acted on by an elastic element that ensures that the claw grip is held in the open position when it is not adjusted to the tightened position.

As a further alternative, the present invention is characterized in that the elastic element consists of a coil spring.

As yet a further alternative, the present invention is characterized in that at least one of the jaws is provided with a recess extending essentially parallel to the longitudinal direction of the rail section.

In addition, the present invention is characterized in that the securing devices include a cradle mounted to the rail section, which cradle is U-shaped in cross-section, one flange of the U being higher than the opposite flange and the higher flange being located on the side of the rail section opposite to that from which the bicycle is loaded.

BRIEF DESCRIPTION OF THE DRAWINGS

The above characteristic features and further advantageous features will be clear from the following description of a preferred embodiment as illustrated in the appended figures, of which.

DETAILED DESCRIPTION

Figure 1:
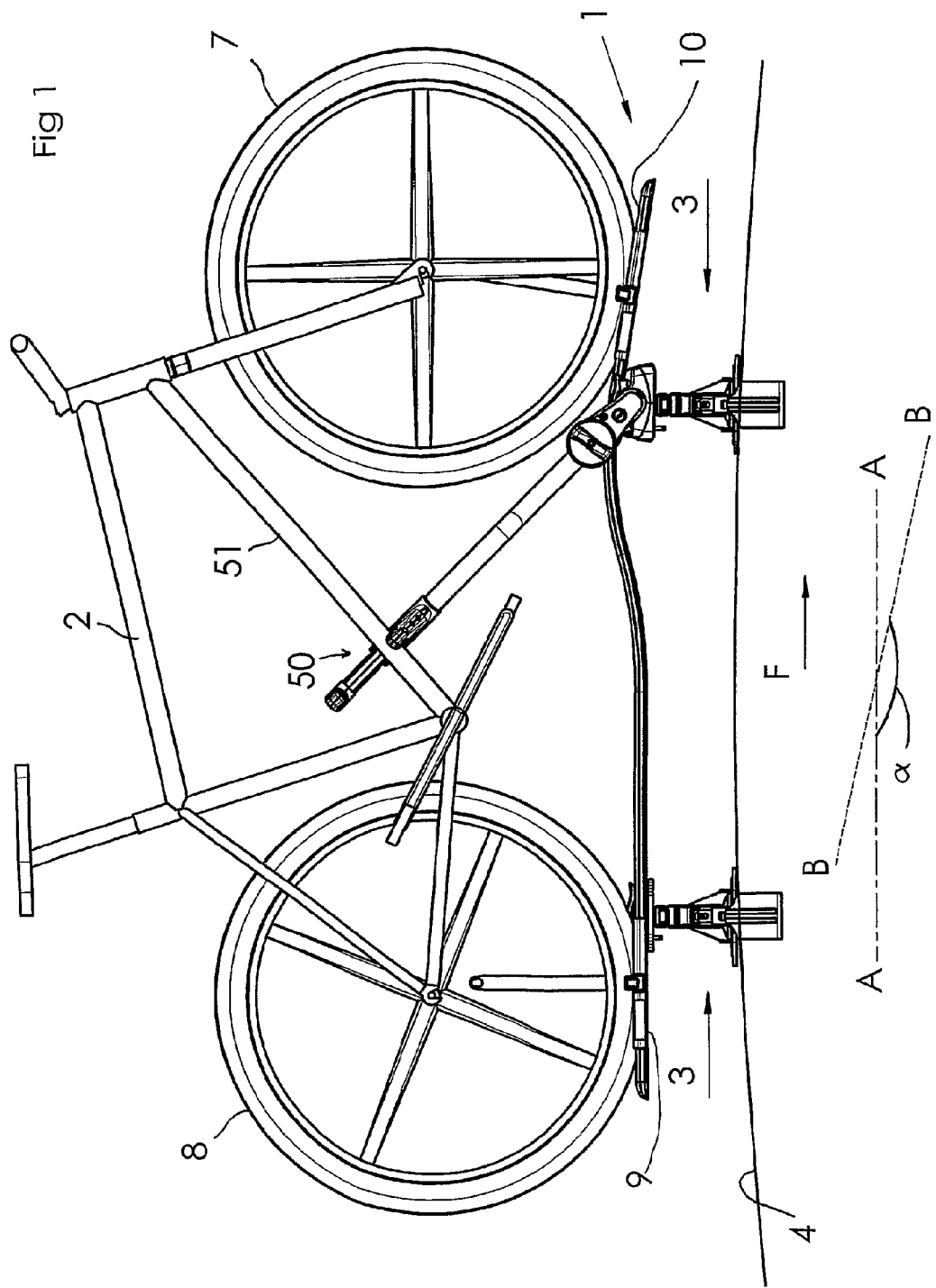
FIG. 1 is an elevational view of a load carrier configured in accordance with the present invention, and showing a bicycle which is loaded and mounted on a vehicle roof with the claw grip and securing devices untightened.
Figure 2:
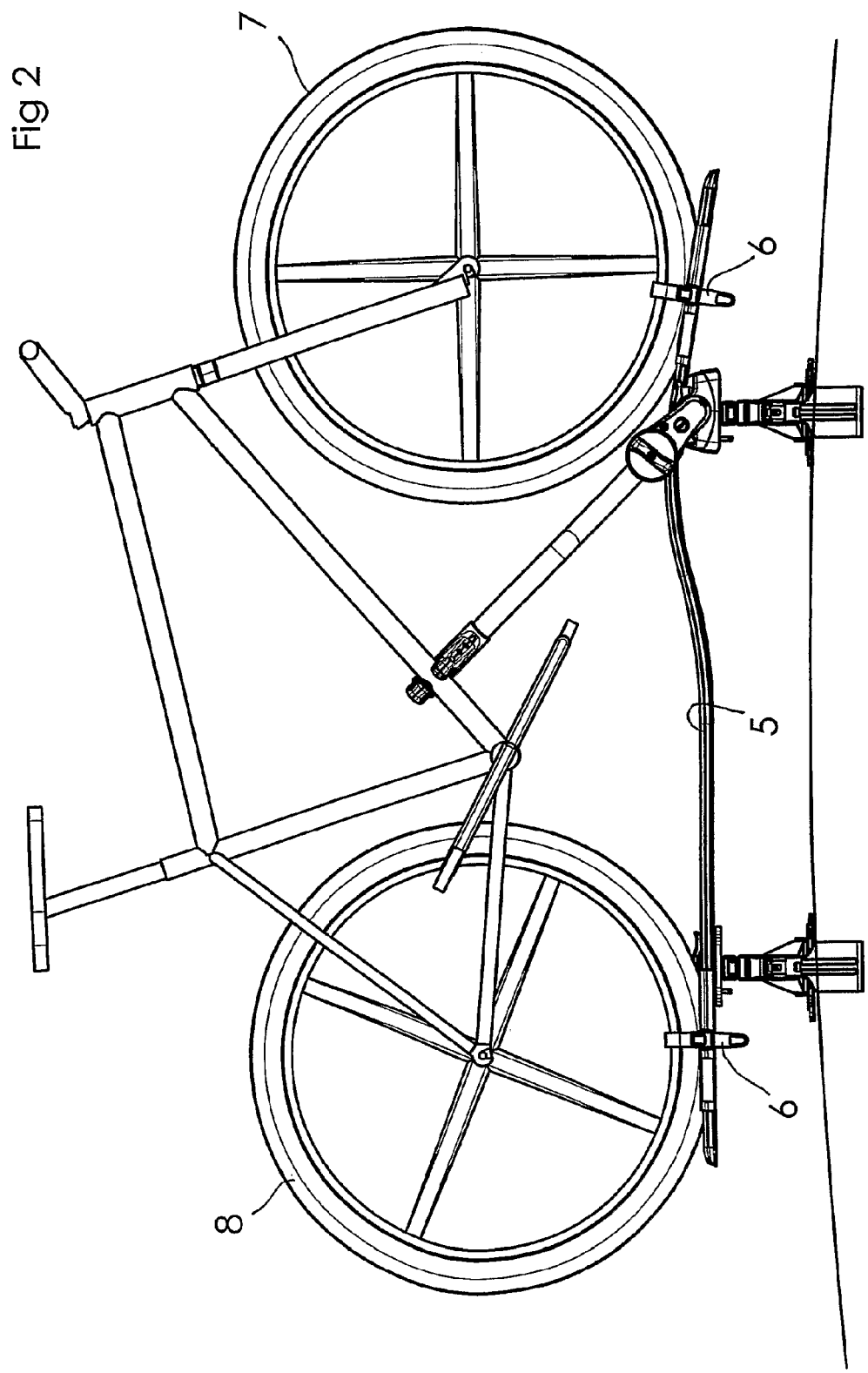
FIG. 2 is an elevational view corresponding to FIG. 1, showing the claw grip and securing devices in the tightened mode.

FIGS. 1 and 2 show a load carrier 1 loaded with a bicycle 2. The load carrier is mounted on a vehicle roof 4, which is shown only schematically in the figures, by means of mounting devices 3. A longitudinal rail section 5 forming part of the load carrier is also shown in the figures. The rail section is provided with securing devices 6 for securing the front wheel 7 and the rear wheel 8 respectively of the bicycle to the rail section when the bicycle is loaded. The longitudinal direction (axis) of the rail section in area 9 on which the rear wheel of the bicycle is placed (indicated by the dash-dotted line A-A) and the longitudinal direction (axis) 10 of the rail section in the area on which the front wheel of the bicycle is placed (indicated by the dashed line B-B) intersect one another at an angle α. As may be appreciated from FIGS. 1-3, the angle α is measured in a substantially vertical plane. The effect of this angular relationship between areas 9 and 10 is that a bicycle placed on the rail tends to move (roll) in the direction of the longitudinal direction of the rail section. In the illustrated embodiment, a front portion 10 of the rail 5 is inclined with respect to horizontal, while a back portion 9 of the rail 5 is oriented substantially horizontally. Given the relationship shown in the figures, the bicycle tends to move in the direction indicated by the arrow F in FIG. 1. Should area 9 be angled in the direction opposite to that shown in the figures, the bicycle will, as will clearly be seen, tend to move in the opposite direction to the arrow F. It will further be clear to one skilled in the art that the angled area may equally well be located in the area on which the rear wheel 8 of the bicycle is placed in order to achieve this movement effect.

Figure 3:
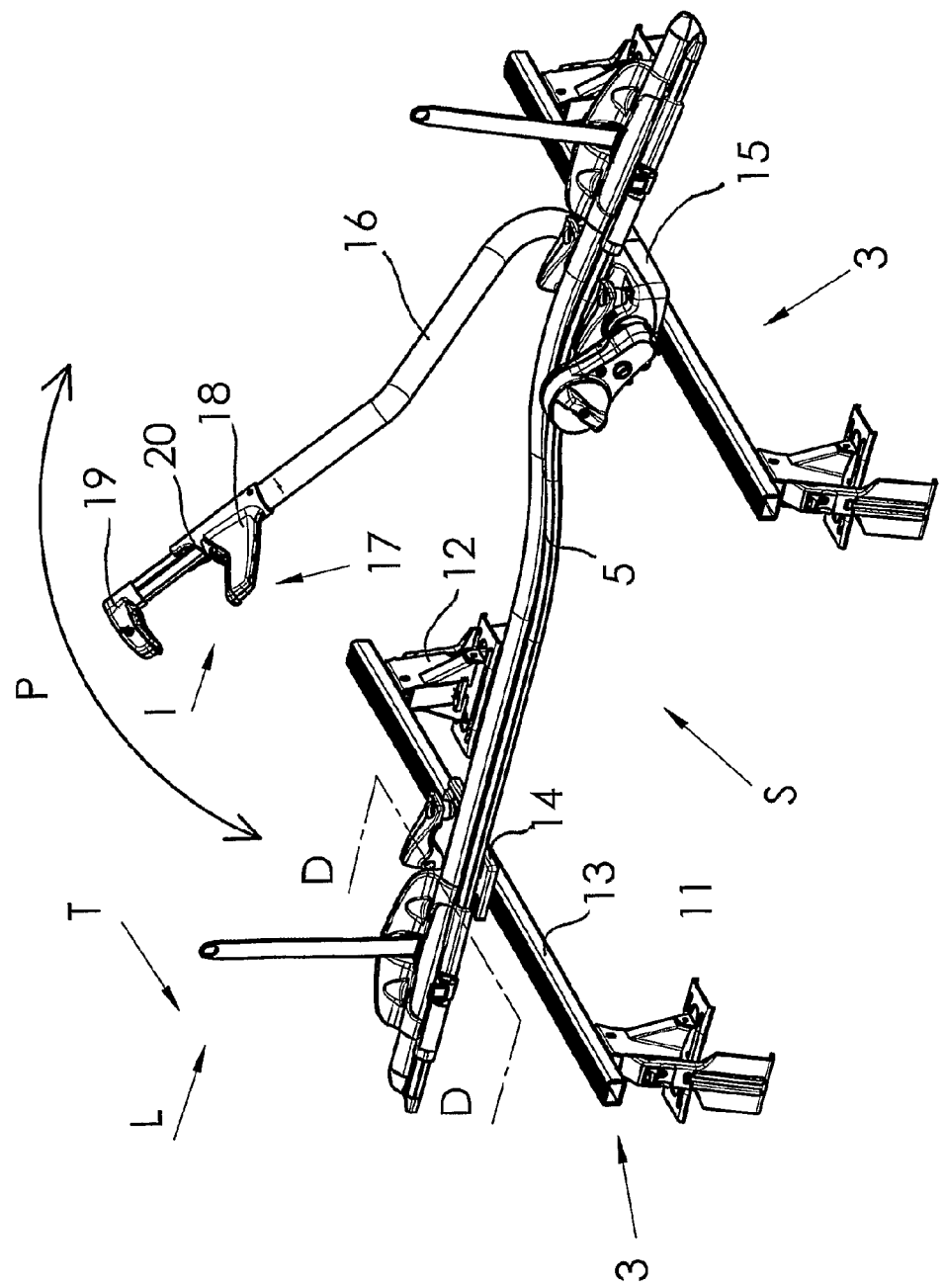
FIG. 3 is a perspective view of a load carrier in accordance with the present invention mounted on mounting devices.

FIG. 3 shows the load carrier 1 in detail. The figure shows the mounting devices 3, which comprise a first load carrier foot 11 and a second load carrier foot 12, each designed for attachment to the vehicle roof, but which is not shown in FIG. 3. Each pair of load carrier feet 11 and 12 supports a load carrier bar 13 on which the rail section 5 is mounted in a known manner by means of connecting devises 14 and 15. A retaining arm 16 is, in known manner, connected to the rail section 5 in a pivoting manner and can be pivoted in the direction indicated by the double arrow P. The friction of the pivoted mounting is, in known manner, designed so that the arm remains in the position to which it is adjusted, regardless of what that position is. In the figure, the retaining arm is attached to the connecting device 15, although it will be obvious to one skilled in the art that the arm may equally well be attached in pivoting manner to the rail section 5 or to the load carrier bar 13. The retaining arm 16 is provided with a claw grip 17 consisting of a first jaw 18 and a second jaw 19 whose function will be described below. The longitudinal direction of the jaws is indicated by the arrow T and, as shown in the figure, this direction is lateral to the longitudinal direction of the rail section as indicated by the arrow L. The jaw 18 is provided with a recess 20, whose direction is indicated by the arrow I and whose direction is essentially parallel to the direction L. The function of the recess will be described below.

Figure 4:
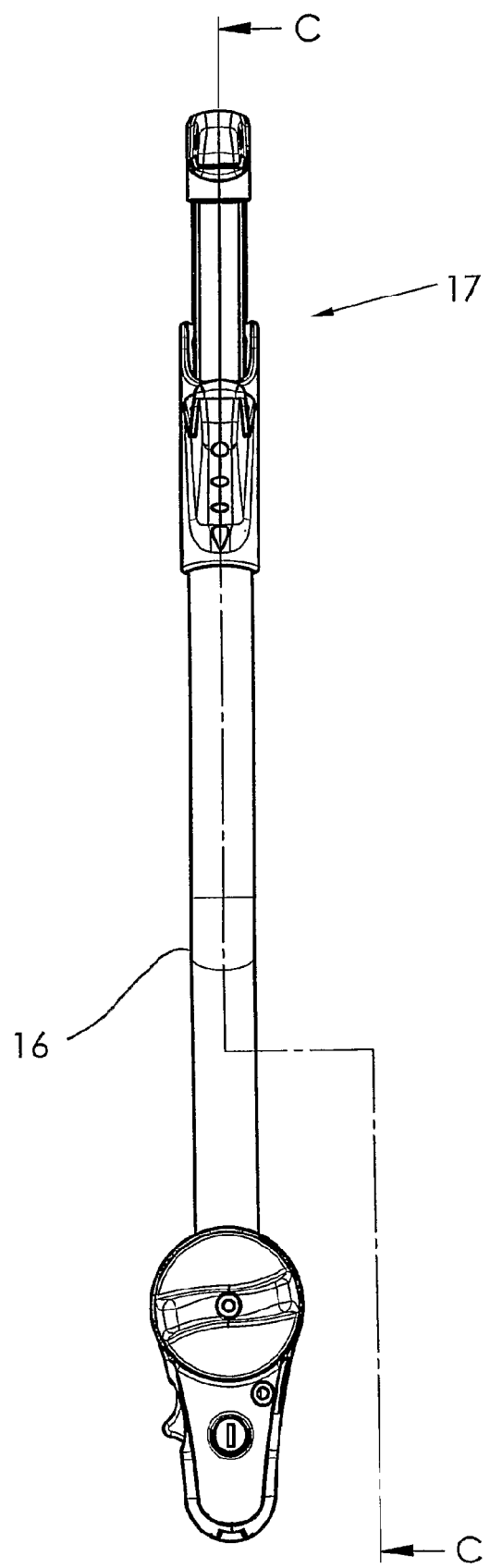
FIG. 4 is a detail view of a retaining arm forming part of the invention.
Figure 5:
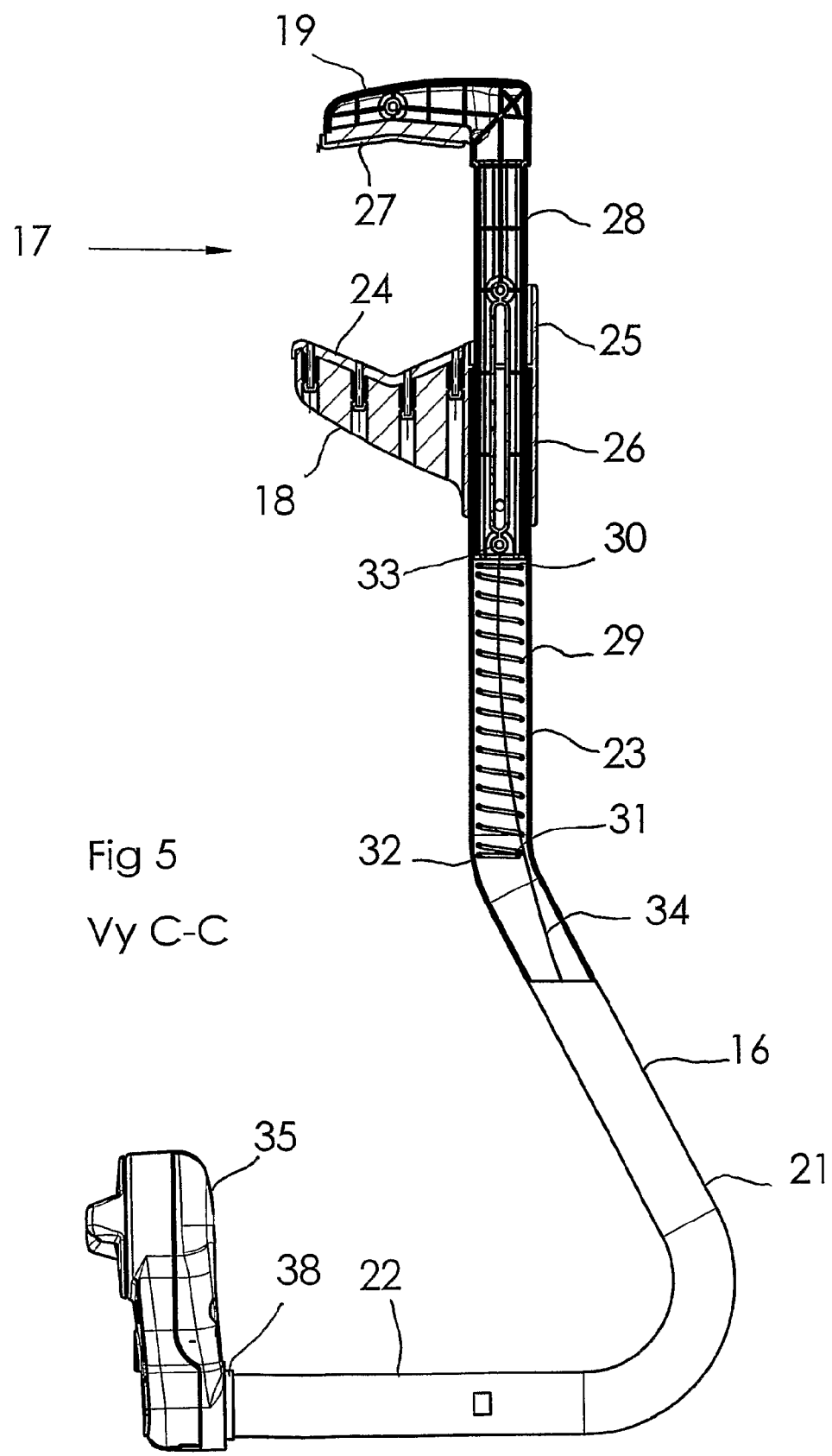
FIG. 5 is a view through section C-C in FIG. 4.

FIGS. 4 and 5 show the retaining arm 16 in detail. As the figures show, the arm consists of a tube 21 bent essentially in an L-shape comprising (including, but not necessarily limited to) an essentially horizontal tube section 22 which, as shown in FIG. 3, is attached, in known manner, pivotally relative to the rail section 5, and an essentially vertical tube section 23 on which the claw grip 17 is mounted. The figures also show the jaws 18 and 19. The jaw 18 consists of a first clamping part 24 and a mounting part 25 consisting of a sleeve 26 mounted on the tube section 23. In the embodiment shown, the sleeve 26 is mounted on the tube section 23 with a drive fit, ensuring that the jaw 18 is attached securely to the arm 16. The mounting of the sleeve 26 on the tube section 23 may obviously take any of the forms known to one skilled in the art for achieving a secure connection between the parts. The jaw 19 consists of a second clamping part 27 and a shaft section 28, which is movably mounted in the tube section 23. An elastic element in the form of a coil spring 29 acts with a first end 30 on the shaft section 28 and rests with a second end 31 on a support 32 located in the tube section 23, whereby the jaw 19 is pressed apart from the jaw 18 by the force of the coil spring to open the claw grip 17. The shaft section 28 is provided with an attachment ring 33 to which a cable 34 is connected and which cable runs through the L-shaped tube to an attachment to a tightening device 35 mounted on the L-shaped tube 21. Operation of the tightening device causes the cable 34 to pull the jaw 19 downward towards the jaw 18 against the force of the coil spring 29.

Figure 7:
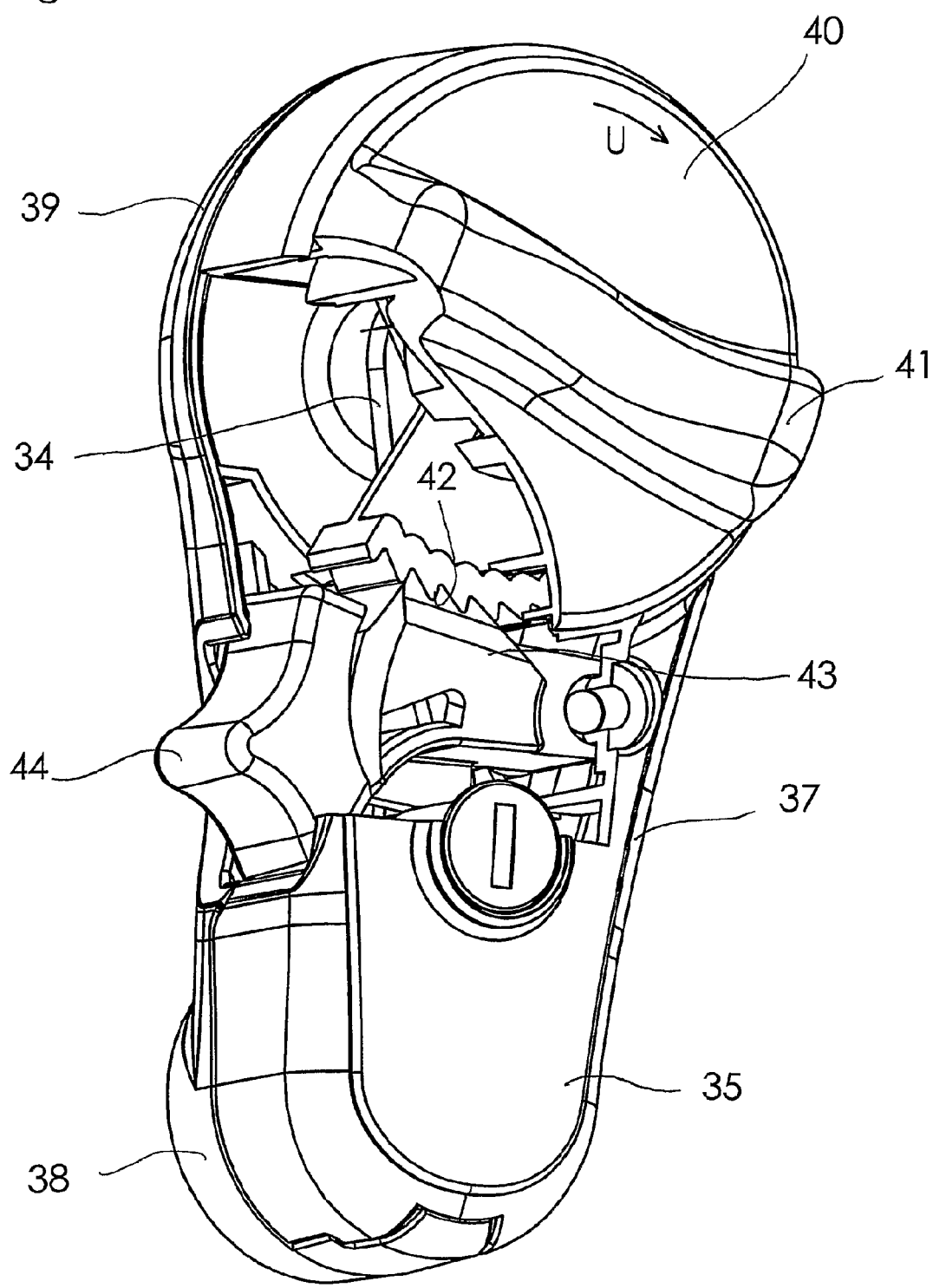
FIG. 7 is a detail view of a tightening device attached to the retaining arm.

The tightening device 35 is shown in detail in FIG. 7, in which certain parts are cut away to show the operation of the device more clearly. Since the operation of the device as part of the invention can be achieved in a large number of ways, only a general description with reference to FIGS. 5 and 7 will be given. The device incorporates a body part 37 which, at the lower end 38, is attached to the horizontal tube section 22 of the retaining arm 16. In the upper end 39 of the body part is a drum 40 journalled in bearings which, by means of a handle 41, can be rotated clockwise as indicated by the arrow U. The drum 40 is provided with a saw tooth periphery 42 which engages with a saw tooth pawl 43, which pawl is spring-loaded in the direction towards the saw tooth periphery 42, which spring is not shown in the figures. The cable 34 is attached to the drum 40 and is wound onto the drum 40 when the drum is rotated clockwise, causing the movable jaw 19 to move towards the fixed jaw 18 and preventing the coil spring 29 from moving the jaw 19 apart from the jaw 18 due to the interaction between the saw tooth periphery 42 and the pawl 43. The pawl 43 is in contact with, and is acted on by, an operating button 44, with which the pawl 43 can be made to disengage from the periphery, enabling the drum 40 to be rotated counter clockwise and the coil spring 29 to press the jaw 19 apart from the jaw 18 to a position in which the claw grip is opened.

Figure 6:
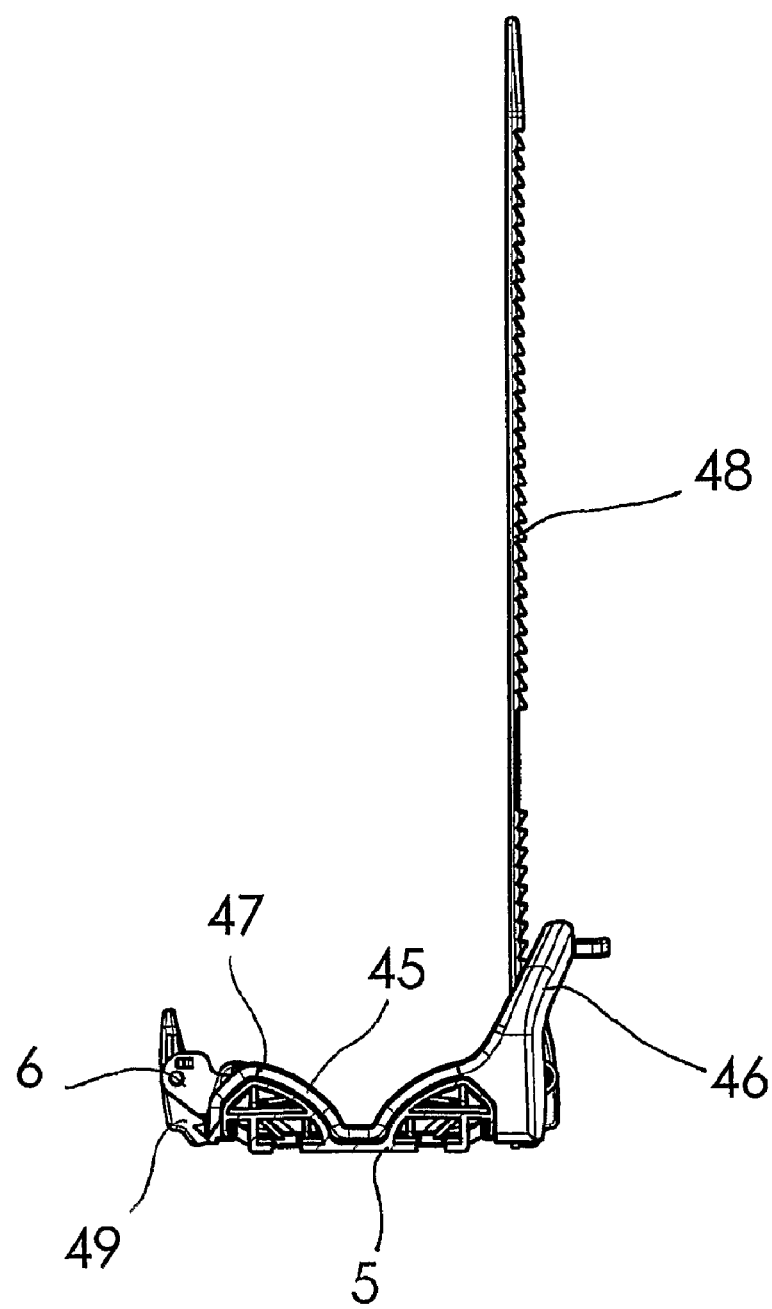
FIG. 6 is a view through section D-D in FIG. 3 of one of the securing devices forming part of the invention.

FIG. 6 is a detail view of a securing device 6 through section D-D in FIG. 3. The figure shows the longitudinal rail section 5. The securing device incorporates a cradle 45 mounted on the rail section 5, which cradle is U-shaped in cross-section, with a high flange 46 and a low flange 47. The cradle 45 is provided with a tightening strap 48 on the same side as the high flange and a snap catch 49 on the same side as the low flange 47. The wheels of a loaded bicycle are secured to the securing devices by passing the tightening strap 48 through the wheel and securing it with the snap catch 49.

The function and use of the load carrier will be described below with reference to FIGS. 1-7. When a bicycle is to be loaded onto a load carrier mounted on a vehicle roof, the bicycle is loaded from the side indicated by the arrow S in FIG. 3 and the retaining arm 16 is turned to the position shown in FIG. 3. Since the friction of the retaining arm attachment is such that that the arm remains in the position to which it is adjusted, and when the claw grip is adjusted to the open position by the coil spring 27, causing the jaws to form a gap 50 facing the direction of loading, the user is not required, once the arm has been moved into position, to pay further attention to the arm or claw grip until the claw grip is to be tightened. The bicycle is then lifted onto the rail section 5 from the direction indicated by the arrow S in FIG. 3 and placed with each wheel in its respective securing device 6. Since the high flange 46 of the securing device is located at the side of the rail section furthest from the direction of loading, the possibility of the wheel passing beyond the rail and being placed on the vehicle roof is largely eliminated. When the bicycle has been loaded and raised into the upright position, as shown in FIG. 1, a section of the bicycle frame 51 will be seated in the claw grip 17, which is in the open position. Since the front wheel of the bicycle is resting on area 10 of the rail section and the rear wheel is resting on area 9, the bicycle will tend to move in the direction of the arrow F, causing the frame 51 to come into active contact with the jaw 18 and, specifically, with the recess 20, whereby the bicycle is afforded such support that it remains upright without any other support. The claw grip is then tightened by rotating the drum 40 clockwise with the handle 41 and the straps 47 are thereafter used to secure the wheels to the rail section.

To ensure that the bicycle is given sufficient momentum to move, the angle $\alpha$ should suitably be between 179 and 160 degrees, and an advantageous angle has been discovered to be between 175 and 165 degrees, and a most advantageous angle has been found to range between 174 and 172 degrees. The recess 20 provides enhanced safety against the risk that the bicycle will fall before the claw grip is tightened, although it will be clear to one skilled in the art that the load carrier will function satisfactorily even if no recess is provided.

In the figures, the frame 51 is shown in contact with the jaw 18; however, it will be clear to one skilled in the art that if the area 10 were angled in the opposite direction, the frame 51 would come in contact with the jaw 19, in which case the jaw 19 should be fixed and the jaw 18 movable.

What is claimed is:

1. A load carrier mountable to a roof of a vehicle, said load carrier comprising:

a longitudinal rail comprising first and second planar rail sections for receiving and securing first and second wheels of a bicycle, said first planar rail section extending along said longitudinal rail in a direction along a first longitudinal axis (A-A) proximate an area wherein a first wheel of the bicycle is received and secured, said second planar rail section extending along said longitudinal rail in a direction along a second longitudinal axis (B-B) proximate an area wherein a second wheel of the bicycle is received and secured, said first planar rail section having a free end and an opposite end joined to said second planar rail section by a connecting rail section; said second planar rail section having a free end and an opposite end joined to said connecting rail section; wherein the free end of the second planar rail section slopes downwardly and is horizontally lower than the rest of said second planar rail section; said first longitudinal axis (A-A) arranged at an angle of inclination/declination ($\alpha$) relative to said second longitudinal axis (B-B) such that one of said first and second planar rail sections form an inclined/declined rail section relative to the other, a retaining arm comprises a first end and a second end, said retaining arm pivotable relative to the longitudinal rail proximate said first end, said first end comprising a tightening device and said second end comprising a claw grip for receiving a downtube of a bicycle frame therein, said claw grip having first and second jaws laterally disposed relative to the longitudinal rail and forming a gap having an opening to a side (S) of the longitudinal rail, said tightening device communicating with said claw grip to open and close said gap, wherein the retaining arm is pivotally disposable by an operator to a position wherein the claw grip receives the downtube of a bicycle loaded upon the longitudinal rail, the angle of inclination/declination ($\alpha$) of said second planar rail section causes the bicycle to move along the longitudinal rail until the downtube enters into active engagement with at least one of the jaws of the claw grip thereby maintaining the bicycle in an upright position even if the claw grip is not tightened, and wherein said second planar rail section extends along the second longitudinal axis beyond a wheel of said bicycle installed therein when said bicycle is maintained in said upright position so that the force of gravity maintains the downtube in said active engagement with the at least one of the jaws of the claw grip.

2. The load carrier (1) as recited in claim 1, wherein the angle ($\alpha$) measures between 179 and 160 degrees.

3. The load carrier (1) as recited in claim 1, wherein the angle ($\alpha$) measures between 175 and 165 degrees.

4. The load carrier (1) as recited in claim 1, wherein the angle ($\alpha$) measures between 174 and 172 degrees.

5. The load carrier as recited in claim 1, wherein the claw grip is acted on by an elastic element that ensures that the jaws of the claw grip are maintained in the open position when the claw grip is not adjusted to the tightened position.

6. The load carrier as recited in claim 5, wherein the elastic element comprises of a coil spring (29).

7. The load carrier as recited in claim 5, wherein at least one of the jaws is provided with a recess extending essentially parallel (I) to the longitudinal direction (L) of a rail section.

8. The load carrier as recited in claim 1, wherein a cradle is attached to at least one of said first or second rail sections, said at least one cradle is U-shaped in cross-section, one flange of the section being higher than the other flange and the higher flange being located on the side of the rail section opposite to the (S) from which the bicycle is loaded, whereby said first or second wheel of said bicycle is secured.

9. The load carrier as recited in claim 1, wherein said claw grip comprises a movable and fixed jaw, said movable jaw movable relative to said fixed jaw upon actuation of said tightening device.

* * * * *